US009731492B2

(12) United States Patent
Lee et al.

(10) Patent No.: US 9,731,492 B2
(45) Date of Patent: Aug. 15, 2017

(54) SUBSTRATE PEELING APPARATUS AND METHOD OF PEELING SUBSTRATE USING THE SAME

(71) Applicants: SAMSUNG DISPLAY CO., LTD., Yongin, Gyeonggi-Do (KR); TOPTEC CO., LTD, Gyeongsangbuk-Do (KR)

(72) Inventors: Kwangho Lee, Seoul (KR); Youngbae Kim, Gyeonggi-do (KR); Sangil Kim, Gyeonggi-do (KR); Jongseong Kim, Seoul (KR); Hyeokyun Kwon, Chungcheongnam-do (KR)

(73) Assignees: SAMSUNG DISPLAY CO., LTD., Yongin, Gyeonggi-Do (KR); TOPTEC CO., LTD, Gumi-Si, Gyeongsangbuk-Do (KR)

( * ) Notice: Subject to any disclaimer, the term of this patent is extended or adjusted under 35 U.S.C. 154(b) by 46 days.

(21) Appl. No.: 14/474,710

(22) Filed: Sep. 2, 2014

(65) Prior Publication Data

US 2015/0217557 A1 Aug. 6, 2015

(30) Foreign Application Priority Data

Feb. 4, 2014 (KR) ........................ 10-2014-0012720

(51) Int. Cl.
*B32B 43/00* (2006.01)
*B32B 38/10* (2006.01)

(52) U.S. Cl.
CPC ........ *B32B 43/006* (2013.01); *B32B 2309/06* (2013.01); *B32B 2457/20* (2013.01);
(Continued)

(58) Field of Classification Search
CPC .................. B32B 43/006; B32B 38/10; Y10T 156/1132; Y10T 156/1168; Y10T 156/1944; Y10T 156/1978
See application file for complete search history.

(56) References Cited

U.S. PATENT DOCUMENTS 5,676,364 A * 10/1997 Shiiki ................. B65H 3/0816
271/106
6,280,308 B1 8/2001 Ishikawa et al.
(Continued)

FOREIGN PATENT DOCUMENTS

JP 2006243184 9/2006
JP 2013052998 3/2013
(Continued)

*Primary Examiner* — Mark A Osele
(74) *Attorney, Agent, or Firm* — F. Chau & Associates, LLC

(57) ABSTRACT

A substrate peeling apparatus includes a support member and absorption pads. The support member, having a quadrangular shape, includes first and second vertexes diagonally facing each other in a first direction, and third and fourth vertexes diagonally facing each other in a second direction crossing the first direction. The absorption pads is disposed on the support member. The absorption pads are arranged in rows in a direction parallel to the first direction and at least one absorption pad of each row is arranged in a direction parallel to the second direction. An absorption pad of each row includes a hole having an increasing internal diameter as a distance in the first direction between the each row and the first vertex increases. An internal diameter of an absorption pad in a row positioned halfway between the first and second vertexes has a maximum internal diameter.

10 Claims, 14 Drawing Sheets

(52) U.S. Cl.
CPC .... *Y10T 156/1132* (2015.01); *Y10T 156/1168* (2015.01); *Y10T 156/19* (2015.01); *Y10T 156/1944* (2015.01); *Y10T 156/1978* (2015.01)

(56) References Cited

U.S. PATENT DOCUMENTS

| | | | | |
|---|---|---|---|---|
| 7,187,162 | B2 * | 3/2007 | Kerdiles | G01N 19/04 156/765 |
| 7,367,601 | B2 | 5/2008 | Ogimoto | |
| 8,470,129 | B1 * | 6/2013 | Wang | B32B 38/10 156/705 |
| 8,858,859 | B2 * | 10/2014 | Song | B82Y 10/00 156/707 |
| 9,162,435 | B2 * | 10/2015 | Honda | B32B 38/10 |
| 2013/0025796 | A1 | 1/2013 | Burggraf et al. | |
| 2014/0150981 | A1 * | 6/2014 | Itou | B32B 38/1858 156/714 |
| 2014/0209250 | A1 * | 7/2014 | Kawagoe | B32B 43/006 156/701 |
| 2015/0059987 | A1 * | 3/2015 | Kumakura | B32B 43/006 156/714 |
| 2015/0217556 | A1 * | 8/2015 | Lee | B32B 43/006 156/702 |
| 2015/0258767 | A1 * | 9/2015 | Asakawa | B32B 43/006 156/718 |

FOREIGN PATENT DOCUMENTS

| | | |
|---|---|---|
| JP | 2013084526 | 5/2013 |
| KR | 20110063800 | 6/2011 |
| KR | 1020120121104 | 11/2012 |
| WO | 2010090147 | 8/2010 |

\* cited by examiner

SUBSTRATE PEELING APPARATUS AND METHOD OF PEELING SUBSTRATE USING THE SAME

CROSS-REFERENCE TO RELATED APPLICATION

This application claims priority under 35 U.S.C. §119 to Korean Patent Application No. 10-2014-0012720, filed on Feb. 4, 2014 in the Korean Intellectual Property Office, the disclosure of which is incorporated by reference herein in its entirety.

TECHNICAL FIELD

The present invention relates to a substrate peeling apparatus and a method of peeling a substrate using the same.

DISCUSSION OF RELATED ART

Relatively thin substrates (hereinafter, referred to as thin substrates) are used for thin and lightweight display devices. Thin substrates are processed to form pixels or other displaying elements thereon, while attached to support substrates. The support substrates allows the thin substrates to be processed without being bent or cracked in the process. After completion of the process to form the pixels or other displaying elements, the support substrate is removed from the substrate.

SUMMARY

According to an exemplary embodiment of the present invention, a substrate peeling apparatus includes a support member and absorption pads. The support member, having a quadrangular shape, includes first and second vertexes diagonally facing each other in a first direction, and third and fourth vertexes diagonally facing each other in a second direction crossing the first direction. The absorption pads is disposed on the support member. The absorption pads are arranged in rows in a direction parallel to the first direction and at least one absorption pad of each row is arranged in a direction parallel to the second direction. An absorption pad of each row in the absorption pads includes a hole having an increasing internal diameter as a distance in the first direction between the each row and the first vertex increases. If a row is positioned halfway in the first direction between the first and second vertexes, the internal diameter of an absorption pad in the row has a maximum internal diameter.

According to an exemplary embodiment of the present invention, a substrate peeling method is provided. A combined structure of a substrate and a support substrate is prepared. The substrate is attached to the support substrate. The substrate is partially separated from the support substrate at a predetermined area in a first corner of the combined structure. An increasing pulling-up force is sequentially applied to the combined structure along a first direction from the first corner of the combined structure to a center of the combined structure to separate the substrate from the support substrate. The separation starts from the predetermined area of the substrate. A decreasing pulling-up force is sequentially applied to the combined structure along the first direction from the center of the combined structure to a second corner of the combined structure to completely separate the substrate from the support substrate. The second corner of the combined structure is diagonally opposite to the first corner. The first and second corners and the center of the combined structure is aligned in the first direction.

BRIEF DESCRIPTION OF THE DRAWINGS

These and other features of the present invention will become more apparent by describing for example exemplary embodiments thereof with reference to the accompanying drawings of which.

DETAILED DESCRIPTION OF EXEMPLARY EMBODIMENTS

Figure 1:
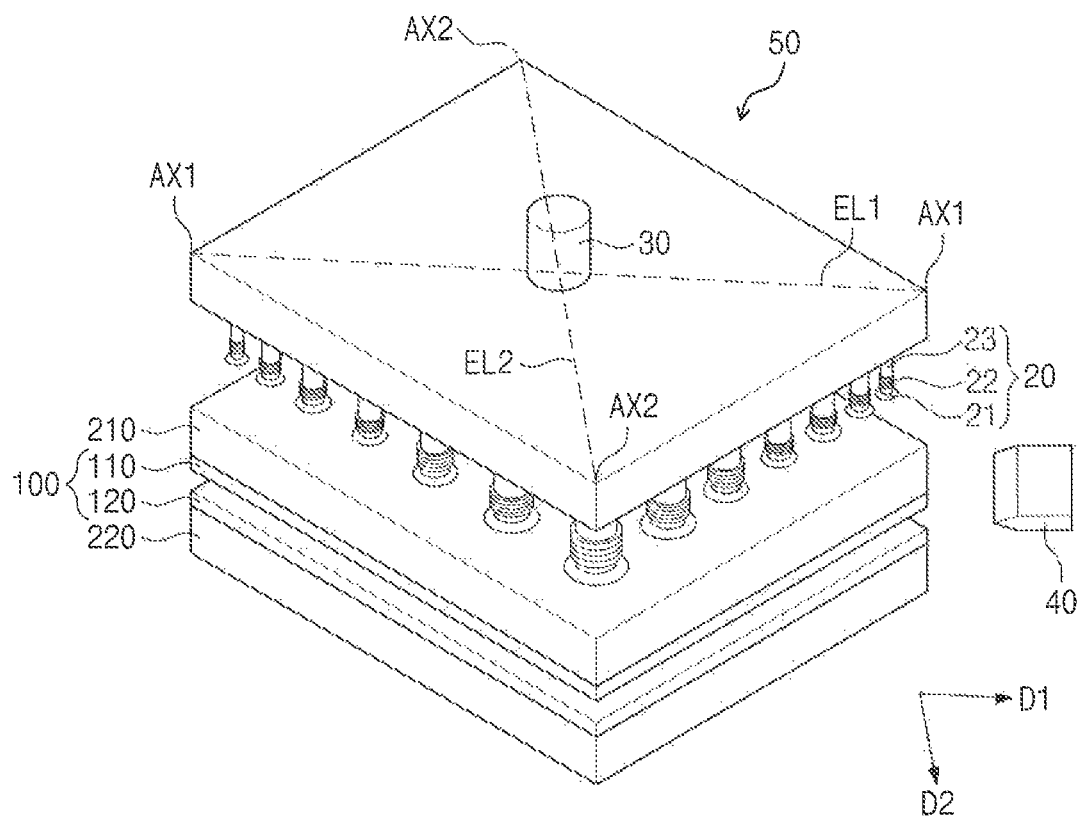
FIG. 1 is a perspective view of a substrate peeling apparatus according to an exemplary embodiment of the present invention.

Exemplary embodiments of the present invention will be described below for example with reference to the accompanying drawings. However, the present invention may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

Hereinafter, the present invention will be explained for example with reference to the accompanying drawings.

Figure 2:
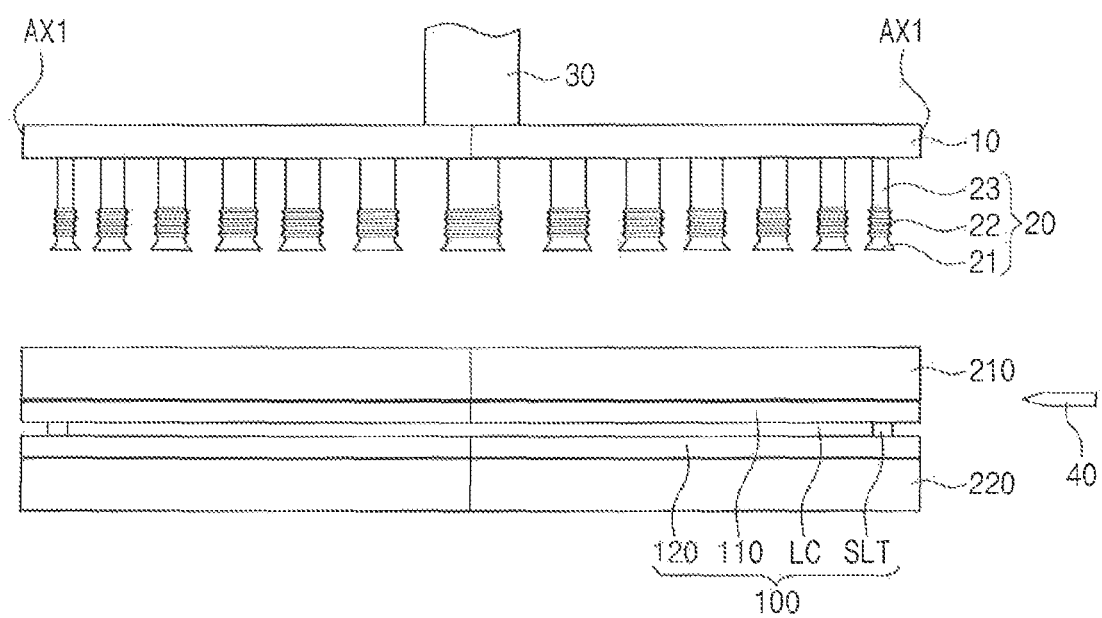
FIG. 2 is a side view showing the substrate peeling apparatus of FIG. 1.

FIG. 1 is a perspective view showing a substrate peeling apparatus according to an exemplary embodiment of the present invention and FIG. 2 is a side view showing the substrate peeling apparatus of FIG. 1.

Referring to FIGS. 1 and 2, a display panel 100 is disposed under the substrate peeling apparatus 50 and support substrates 210 and 220 are disposed on upper and lower surfaces of the display panel 100, respectively. The support substrates 210 and 220 may be referred to as stages 210 and 220.

The display panel 100 includes two substrates 110 and 120 disposed to face each other and a liquid crystal layer LC disposed between the two substrates 110 and 120. The substrates 110 and 120 include a first substrate 110 and a second substrate 120. The first substrate 110 may be, but is not limited to, a thin film transistor substrate 110, and the second substrate 120 may be, but is not limited to, a color filter substrate 120. The first substrate 110 and the second substrate 120 are coupled to each other by a sealant SLT.

The support substrates 210 and 220 include a first support substrate 210 and a second support substrate 220. When the display device is manufactured, the first substrate 110 is placed on and attached to the first support substrate 210 and the second substrate 120 is placed on and attached to the second support substrate 210.

Each of the first and second substrates 110 and 120 may be a thin substrate. The first and second substrates 110 and 120 are supported by the first and second support substrates 210 and 220 in the process of manufacturing the display device. When the display device is manufactured, pixels is formed on the first substrate 110 attached to the first support substrate 210. For instance, thin film transistors and pixel electrodes connected to the thin film transistors of the pixels are formed on the first substrate 110. Color filters corresponding to the pixels and a common electrode facing the pixel electrodes are formed on the second substrate 120 attached to the second support substrate 220.

Then, the liquid crystal layer LC is formed between the first and second substrates 110 and 120, and the first and second substrates 110 and 120 are coupled to each other by the sealant SLT.

After the display panel 100 is manufactured, the first substrate 110 is peeled away from the first support substrate 210 by the substrate peeling apparatus 50 and the second substrate 120 is peeled away from the second support substrate 220 by the substrate peeling apparatus 50. Although not shown in the drawings, additional substrate peeling apparatus may be disposed under the second support substrate 220 to peel away the second substrate 120 from the second support substrate 220.

The method of peeling the first and second substrates 110 and 120 from the first and second support substrates 210 and 220 using the substrate peeling apparatus 50 will be described for example later.

The substrate peeling apparatus 50 includes a support member 10, absorption pads 20, a driver 30, and a knife 40.

The first and second substrates 110 and 120 and the first and second support substrates 210 and 220 may have a quadrangular shape. In addition, the support member 10 may have a quadrangular shape corresponding to that of the first and second support substrates 210 and 220. For example, the first and second substrates 110 and 120 and the first and second support substrates 210 and 220 have a rectangular shape and the support member 10 has a rectangular shape corresponding to that of the first and second support substrates 210 and 220.

The absorption pads 20 are disposed on a lower surface of the support member 10. The driver 30 is disposed on an upper surface of the support member 10 at the center of the support member 10. The support member 10 is aligned to overlap with the first and second support substrates 210 and 220.

Hereinafter, an imaginary line connected between first apexes AX1 facing each other among four apexes AX1 and AX2 of the support member 10 may be referred to as a first extension line EL1. An imaginary line connected between second apexes AX2 facing each other and different from the first apexes AX1 among four apexes AX1 and AX2 of the support member 10 may be referred to as a second extension line EL2. Hereinafter apex may be interchangeably used with vertex or corner.

A direction in which the first extension line EL1 extends may be referred to as a first direction D1 and a direction in which the second extension line EL2 extends may be referred to as a second direction D2. Therefore, the first direction D1 crosses the second direction D2.

The absorption pads 20 have various sizes. The sizes of the absorption pads 20 become larger as a distance from the second extension line EL2 decreases. In addition, a distance between the absorption pads 20 becomes larger as the distance from the second extension line EL2 decreases. Detailed descriptions on the size and arrangement of the absorption pads 20 will be described for example later with reference to FIGS. 5 to 7.

The absorption pads 20 have a cylindrical shape, but the present invention is not limited thereto. For instance, the absorption pads 20 may have a polygonal shape. The absorption pads 20 are attached to the first support substrate 210 or the second support substrate 220 by using a vacuum absorption force. The absorption pads 20 may be connected to a vacuum pump (not shown) to generate the vacuum absorption force.

Each of the absorption pads 20 includes an absorption part 21, a buffer part 22 and a connection part 23. The buffer part 22 is connected to an upper portion of the absorption part 21, and the connection part 23 is disposed on the buffer part 22 to connect the buffer part 22 to the support member 10. The absorption part 21 and the buffer part 22 may be formed of a rubber material.

The absorption part 21 is attached to the first support substrate 210 or the second support substrate 220 using a vacuum absorption force. The buffer part 22 has a predetermined buffer force acting in an up and down direction.

The driver 30 moves up and down to transfer the support member 10 along the up and down direction. Thus, the absorption pads 20 connected to the lower portion of the support member 10 may move up and down by the driver 30. The absorption pads 20 transferred by the driver 30 are attached to the first support substrate 210 or the second support substrate 220 by a vacuum absorption force.

Hereinafter, the process of attaching the absorption pads 20 to the first support substrate 210 will be described.

The knife 40 is arranged to cut a predetermined region of the first and second substrate 110 and 120 while the first and second substrate 110 and 120 is attached to the absorption part 21 using a vacuum absorption force. For instance, the knife is adjacent in the first direction D1 to one end of the first substrate 110 and the first support substrate 210 or one end of the second substrate 120 and the second support substrate 220.

The one end of the first substrate 110 and the first support substrate 210 or one end of the second substrate 120 and the second support substrate 220 corresponds to the first apex AX1 in the first direction D1. For the convenience of description, the knife 40 is adjacent in the first direction D1 to the one end of the first substrate 110 and the first support substrate 210 as shown in FIG. 2.

The knife 40 is inserted into between the first substrate 110 and the first support substrate 210 at the one end of the first substrate 110 and the first support substrate 210, and thus a predetermined area of the one end of the first substrate 110 is peeled. Then the absorption pads 20 are attached to the first support substrate 210.

The absorption pads 20 are sequentially driven from the first apex AX1 corresponding to the peeled area of the first substrate 110 along the first direction D1, so that the first substrate 110 is separated from the first support substrate 210. The substrate peeling method will be described for example later with reference to FIGS. 11A to 11H and 12A and 12B.

Figure 3:
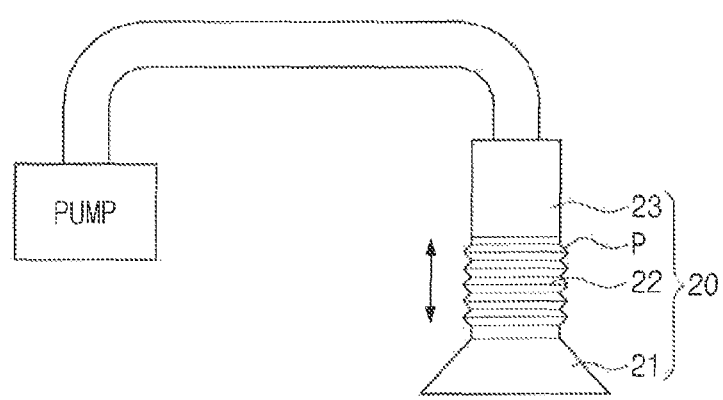
FIGS. 3, 4A, and 4B are enlarged views showing one absorption pad of absorption pads of FIG. 2.
Figure 4A:
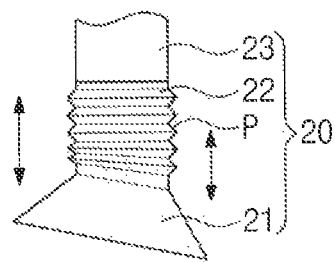
Figure 4B:
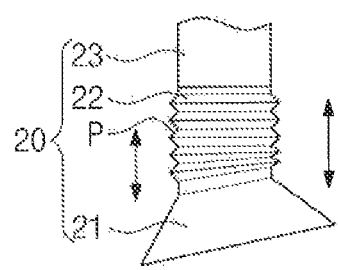

FIGS. 3, 4A, and 4B are enlarged views showing one absorption pad of the absorption pads shown in FIG. 2.

The upper portion of the absorption part 21 has a diameter smaller than that of a lower portion of the absorption part 21. The buffer part 22 has a bellows shape when viewed in a direction substantially perpendicular to a longitudinal direction of the buffer part, and thus the buffer part 22 includes protrusions P, each having a triangular shape, which are defined on an outer surface of the buffer part 22. Due to the shape, the buffer part 22 has the buffering force in the up and down direction.

In addition, the buffering force may occur such that a left side portion of the buffer part 22 is contracted in the up and down direction and a right side portion of the buffer part 22 is expanded in the up and down direction as shown in FIG. 4A, and thus the absorption part 21 may be inclined to the left side portion.

Further, the buffering force may occur such that the left side portion of the buffer part 22 is expanded in the up and down direction and the right side portion of the buffer part 22 is contracted in the up and down direction as shown in FIG. 4B, and thus the absorption part 21 is inclined to the right side portion.

Figure 5:
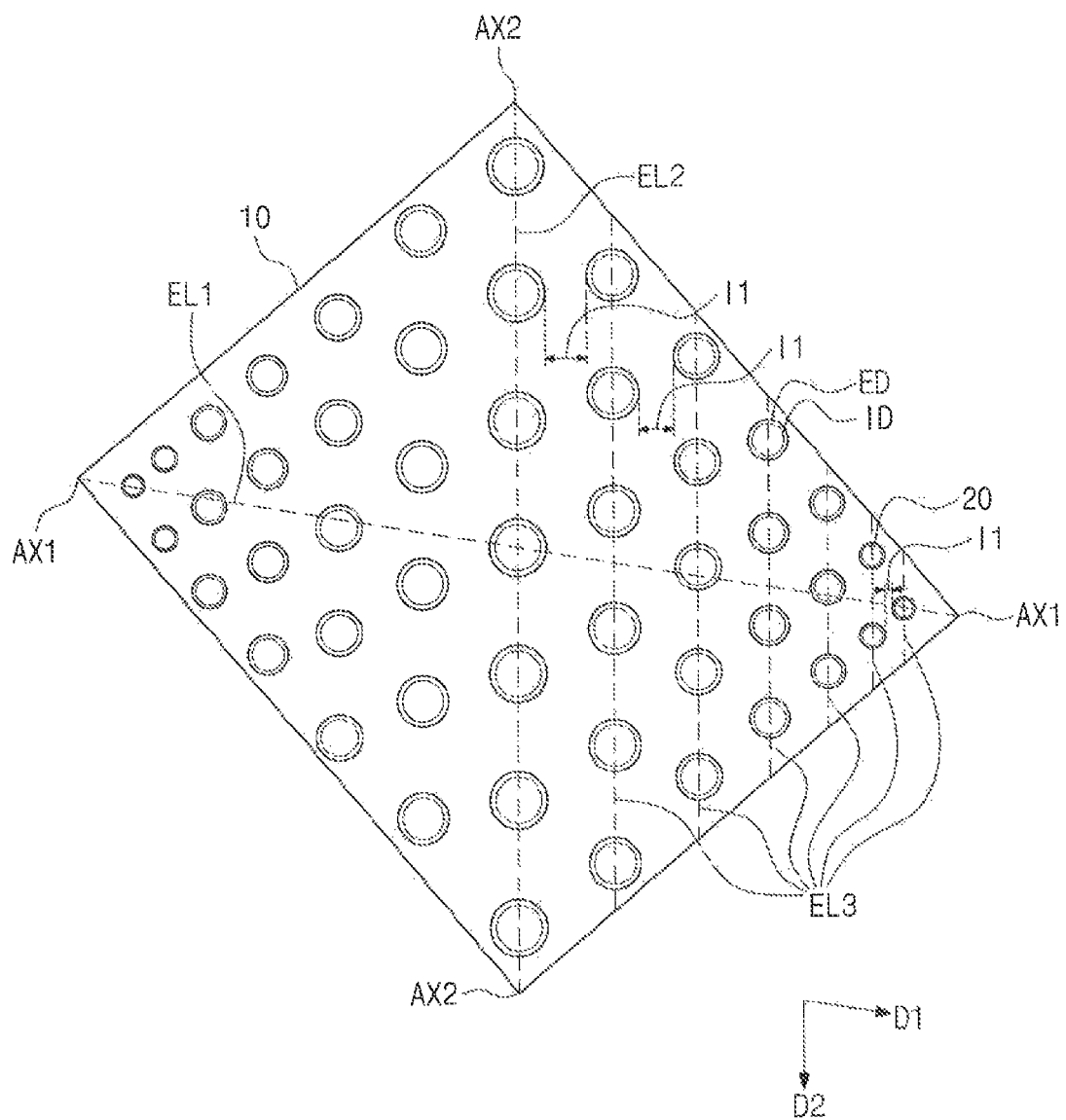
FIG. 5 is a view showing an arrangement of absorption pads of FIG. 2.

FIG. 5 is a view showing an arrangement of the absorption pads shown in FIG. 2.

For the convenience of description, FIG. 5 shows a bottom view of the substrate peeling apparatus 50 when viewed at a lower side of the support member shown in FIG. 1.

Referring to FIG. 5, third extension lines EL3 is disposed between the second extension line EL2 and the first apexes AX1. The third extension lines EL3 extend substantially in parallel to the second direction D2. For example, the third extension lines EL3 extend substantially in parallel to the second extension line EL2. Each of the third extension lines EL3 extends to connect sides of the support member 10 to each other, which share the first apexes A1.

An inner diameter ID of the absorption pad 20 shown in FIG. 5 corresponds to an inner diameter of the lower portion of the absorption part 21. In addition, an outer diameter EL3 of the absorption pad 20 shown in FIG. 5 corresponds to an outer diameter of the lower portion of the absorption part 21. The vacuum absorption force occurs through a predetermined path of the absorption pad 20, which has the inner diameter ID.

The absorption pads 20 are arranged on the second extension line EL2 and the third extension lines EL3. The absorption pads 20 disposed on the second extension line EL2 have the same size. In addition, the absorption pads 20 disposed on the same third lines EL3 have the same size.

The size of the absorption pads 20 is determined by the inner diameter ID of each absorption pad 20. Accordingly, the absorption pads 20 disposed on the second extension lire EL2 have the same inner diameter ID and the absorption pads 20 disposed on the same third extension line EL3 have the same inner diameter ID.

The size of the absorption pads 20 disposed on the second extension line EL2 is different from that of the absorption pads 20 disposed on the third extension lines EL3. In addition, the absorption pads 20 disposed on different third extension lines EL3 have different sizes.

For instance, the size of the absorption pads 20 disposed on the third extension lines EL3 becomes larger as the absorption pads 20 are closer to the second extension line EL2 along the first direction D1. The absorption pads 20 disposed on the second extension line EL2 have the largest size among the absorption pads 20 disposed on the support member 10. For example, the size of the absorption pads 20 disposed on the second extension line EL2 is greater than that of the absorption pads 20 disposed on the third extension lines EL3.

Therefore, the inner diameter ID of the absorption pads 20 becomes larger as the distance from the second extension line EL2 decreases, and the absorption pads 20 disposed on the second extension line EL2 have the largest inner diameter ID.

The absorption pads 20 disposed on the second extension line EL2 are arranged along the second extension line EL2 at a regular interval, and the absorption pads 30 disposed on each third extension line EL3 are arranged along a corresponding third extension line EL3 of the third extension lines EL3 at a regular interval.

When a distance in the first direction D1 between the absorption pads 20 disposed on the third extension lines EL3 adjacent to each other and a distance in the first direction D1 between the absorption pads 20 disposed on the second extension line EL2 and the absorption pads 20 disposed on the third extension line EL3 adjacent to the second extension line EL2 are referred to as a first distance I1, the first distance I1 becomes larger as it goes to closer to the second extension line EL2. For example, the distance in the first direction D1 between the absorption pads 20 disposed on the second extension line EL2 and the third extension lines EL3 becomes larger as the distance from the second extension line EL2 decreases.

The vacuum absorption force of the absorption pads 20 is proportional to the inner diameter ID of the absorption pads 20.

If the absorption pads having the same inner diameter are uniformly arranged in a matrix form, an excessive absorption force may be applied to the area adjacent to the apex of the first support substrate 210. In this case, the first substrate 110 may be damaged due to such excessive absorption three while being peeled away from the first support substrate 210.

The inner diameter ID of the absorption pads 20 in the first direction D1, according to an exemplary embodiment, becomes larger as the distance from the second extension line EL2 decreases, and the absorption pads 20 disposed on the second extension line EL2 have the largest inner diameter ID. A contact area between the first substrate 110 and the first support substrate 210 becomes larger as a distance between the second extension line EL2 and the first apexes AX1 decreases.

Therefore, the absorption pads 20, which have various sizes such that the absorption force proportional to the contact area between the first substrate 110 and the first support substrate 210 occurs, are attached to the first support substrate 210. As a result, the first substrate 110 may be prevented from being damaged while the first substrate 110 is peeled away from the first support substrate 210.

The substrate peeling apparatus 50 according to an exemplary embodiment may precisely and accurately peel the first and second substrates 110 and 120 and prevent the first and second substrates 110 and 120 from being damaged.

Figure 6:
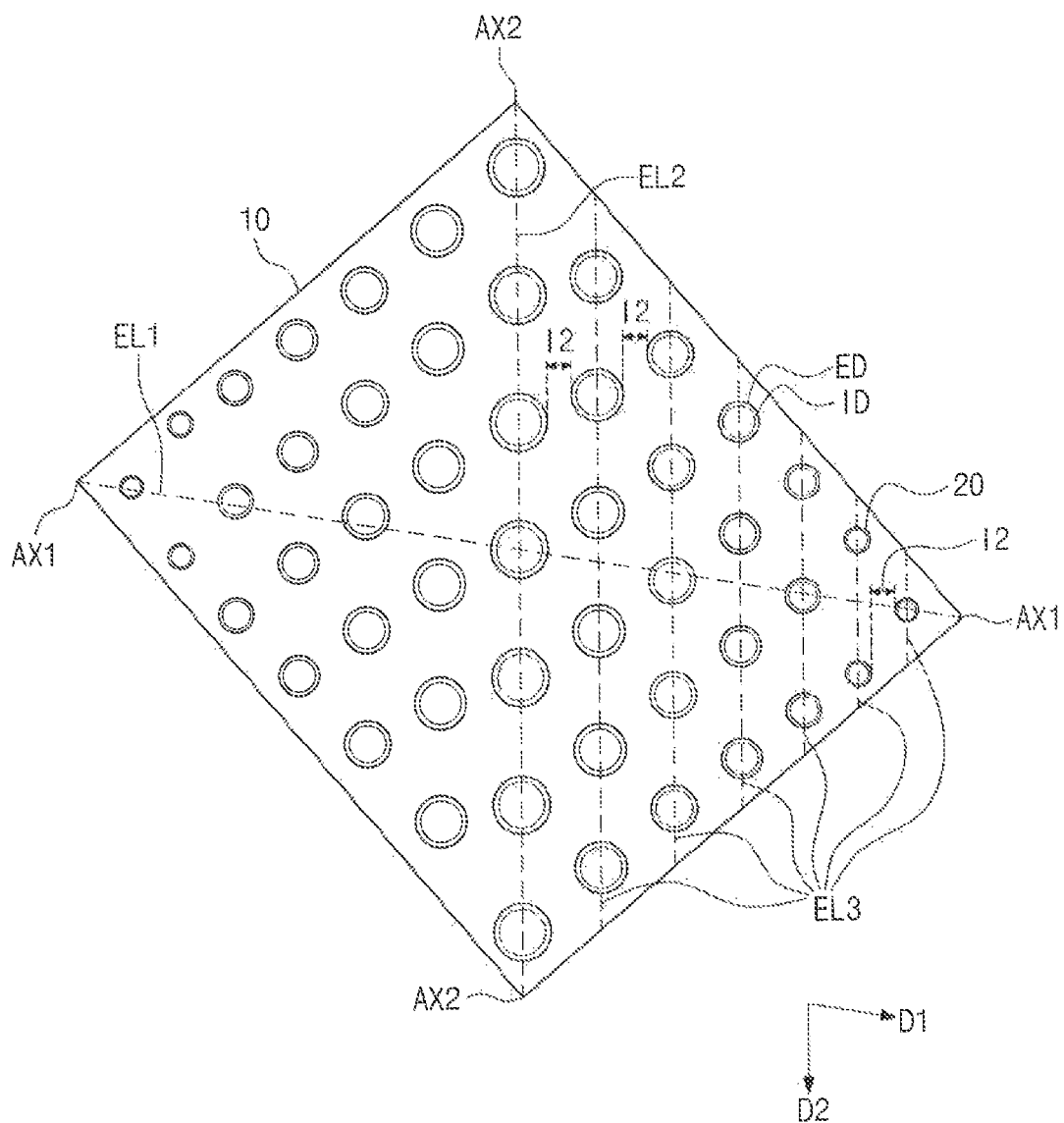
FIGS. 6 and 7 are views showing various arrangements of absorption pads of a substrate peeling member according to an exemplary embodiment of the present invention.
Figure 7:
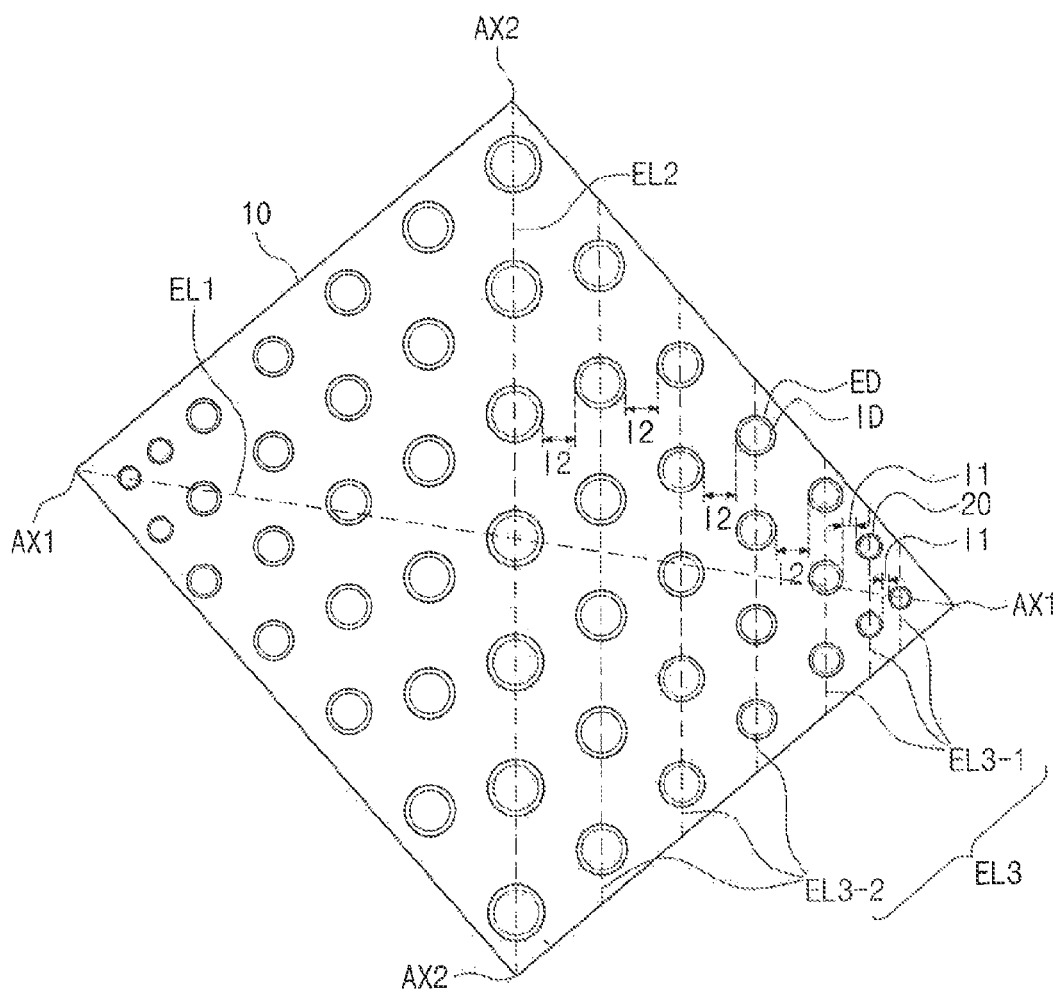
Figure 7:
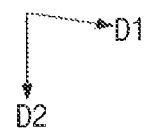

FIGS. 6 and 7 are views showing various arrangements of absorption pads of a substrate peeling member according to an exemplary embodiment of the present invention.

The absorption pads shown in FIGS. 6 and 7 have the same size as that of the absorption pads 20 shown in FIG. 5. The absorption pads 20 disposed on the second extension line EL2 in FIGS. 6 and 7 are arranged along the second extension line EL2 at a regular interval, and the absorption pads 20 disposed on each third extension line EL3 are arranged along a corresponding third extension line EL3 of the third extension lines EL3 at a regular interval substantially similar to the regular interval of the absorption pads 20 disposed on the second extension line EL2.

For example, a distance I2 is constant. The distance I2 is measured in the first direction D1 between the absorption pads 20 disposed on the third extension lines EL3 adjacent to each other. The distance I2 is also measured between the absorption pads 20 disposed on the second extension line EL2 and the absorption pads 20 disposed on the third extension line EL3 adjacent to the second extension line EL2.

Referring to FIG. 7, some of the third extension lines EL3 adjacent to the first apexes AX1 may be referred to as first-third extension lines EL3-1, and the third extension lines EL3 disposed between the first-third extension lines EL3-1 and the second extension line EL2 may be referred to as second-third extension lines EL3-2.

A distance between the absorption pads 20 disposed on the first-third extension lines EL3-1 adjacent to each other in the first direction D1 may be referred to as a first distance I1.

A distance between the absorption pads 20 disposed on the first third extension line EL3-1 and the second-third extension line EL3-2 adjacent to the first-third extension line EL3-1 in the first direction D1 may be referred to as a second distance I2.

A distance between the absorption pads 20 disposed on the second-third extension lines EL3-2 adjacent to each other in the first direction D1 may be referred to as the second distance I2.

A distance between the absorption pads 20 disposed on the second extension line EL2 and the absorption pads 20 disposed on the second-third extension line EL3-2 adjacent to the second extension line EL2 in the first direction D1 may be referred to as the second distance I2.

The first distance I1 becomes larger as the absorption pads 20 disposed on the first-third extension line EL3-1 are distant from the first apex AX1. The second distance I2 is constant. The second distance I2 is larger than the first distance I1. Thus, the distance between two adjacent extension lines EL3-1 increases as the extension lines FL3-1 is distant away from the first apex AX1, and the distance between two adjacent extension lines ELS3-2 is constant. The distance between the second extension line EL2 and the third extension line EL3 adjacent to the second extension line EL2 is the same as the distance between two adjacent extension lines ELS3-2.

Figure 8:
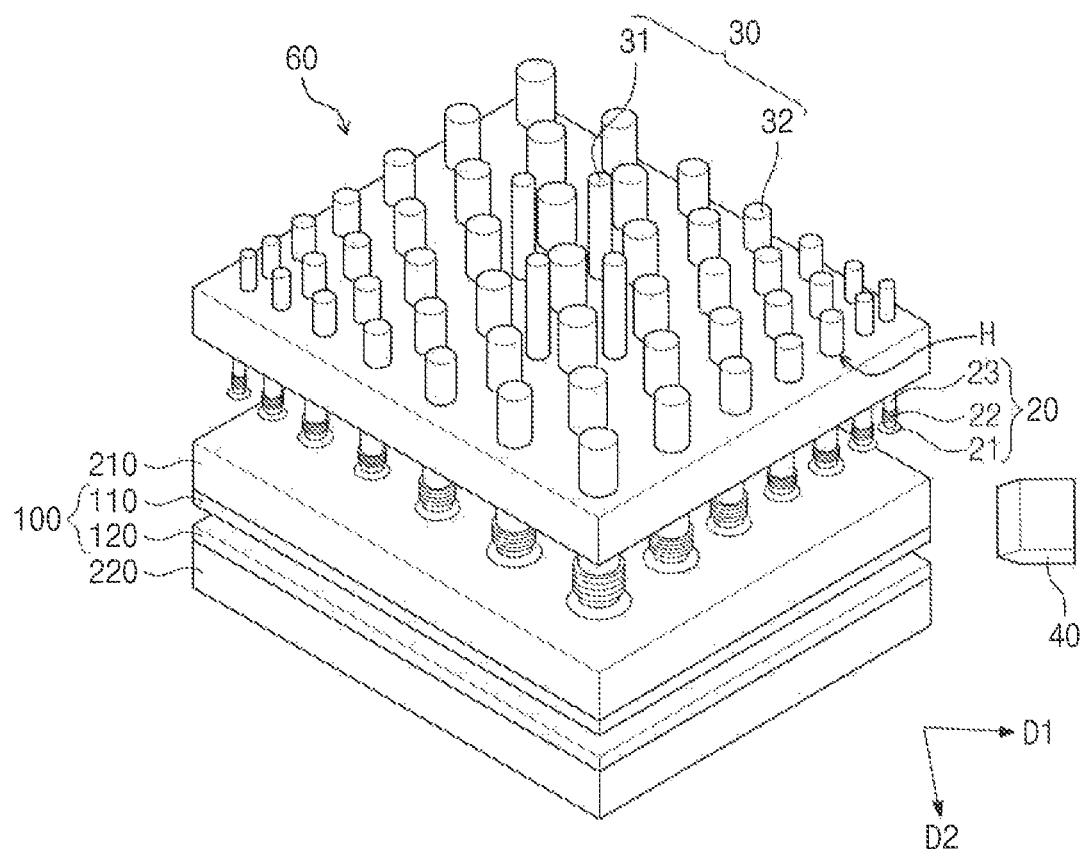
FIG. 8 is a perspective view showing a substrate peeling apparatus according to an exemplary embodiment of the present invention.

FIG. 8 is a perspective view showing a substrate peeling apparatus according to an exemplary embodiment of the present invention.

The substrate peeling apparatus 60 shown in FIG. 8 is substantially similar to the substrate peeling apparatus 50 shown in FIG. 1 except for the driver 30. The absorption pads 20 of the substrate peeling apparatus 60 shown in FIG. 8 are substantially the same as those of the absorption pads 20 shown in FIGS. 5 to 7. Accordingly, the following description will be focused on the driver 30 of the substrate peeling apparatus 60.

Referring to FIG. 8, the substrate peeling apparatus 60 includes first drivers 31 and second drivers 32. The first drivers 31 serve to transfer the support member 10 in the up and down direction. The second drivers 32 are positioned on the absorption pads 20, respectively.

The first drivers 31 are disposed in a predetermined area of the center of the support member 10 and not overlapped with the second drivers 32. The second drivers 32 are respectively connected to the absorption pads 20 via holes H. The via holes H penetrate the support member 10, and thus the second drivel's 32 are connected to the absorption pads 20, respectively. Each of the second drivers 32 transfers a corresponding absorption pad of the absorption pads 20 in the up and down direction.

The absorption pads 20 are attached to the first support substrate 210. Therefore, the first substrate 110 may be precisely and efficiently peeled away from the first support substrate 210, and thus the first substrate 110 may be prevented from being damaged.

The substrate peeling apparatus 60 according to an exemplary embodiment may precisely and accurately peel the first and second substrates 110 and 120 and prevent the first and second substrates 110 and 120 from being damaged.

FIGS. 9A, 9B, 10A, and 10B are views showing a drive of the absorption pad.

Figure 9A:
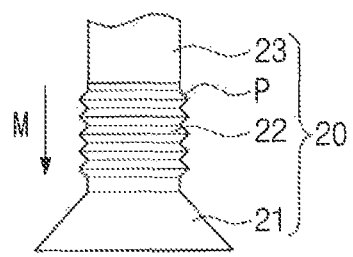
FIGS. 9A, 9B, 10A, and 10B are views showing a drive of absorption pads.
Figure 9A:
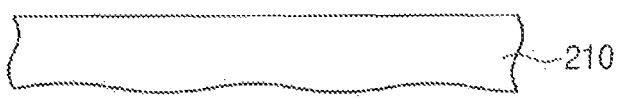
Figure 9B:
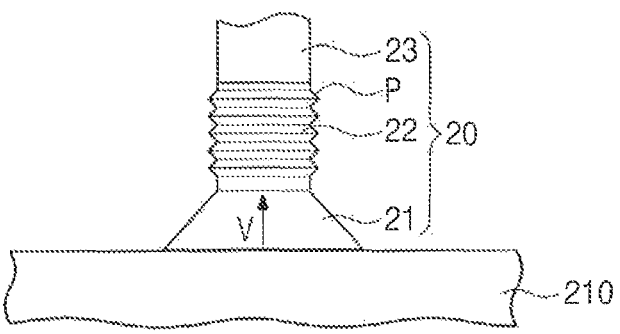

Referring to FIGS. 9A and 9B, the absorption pad 20 may be transferred in the down direction M. The absorption pad 20 transferred in the down direction M makes contact with the first support substrate 210. Then, the absorption pad 20 is driven to have the vacuum absorption force (V) by the vacuum pump connected to the absorption pad 20. Thus, the first support substrate 210 may be attached to the absorption pad 20 by the vacuum absorption force (V), but the present invention is not limited thereto.

Figure 10A:
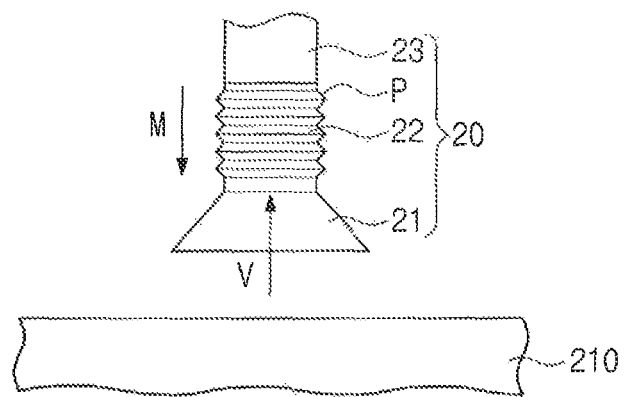
Figure 10B:
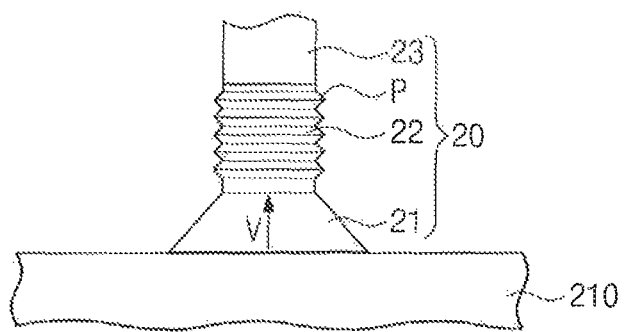

For instance, referring to FIGS. 10A and 10B, the absorption pad 20 is driven to have the vacuum absorption force (V) by the vacuum pump while being transferred in the down direction M. The first support substrate 210 is attached to the absorption pad 20 by the vacuum absorption force (V) when the absorption pad 20 transferred in the down direction M makes contact with the first support substrate 210.

FIGS. 11A to 11H are views showing a method of peeling a substrate using the substrate peeling apparatus according to an exemplary embodiment of the present invention.

Absorption pads described in the present exemplary embodiment may be the absorption pads 20 shown in FIGS. 5 to 7. Hereinafter, the substrate peeling method of the first substrate 110 and the first support substrate 210 using the absorption pads 20 as shown in FIG. 5 will be described.

Figure 11A:
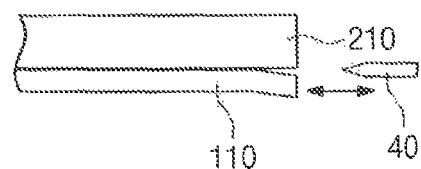
FIGS. 11A to 11H are views showing a method of peeling a substrate using the substrate peeling apparatus of FIG. 1.

Referring to FIG. 11A, the knife 40 is disposed to be adjacent to the one end of the first substrate 110 and the first support substrate 210 in the first direction D1. As described above, the one end of the first substrate 110 and the first support substrate 210 in the first direction D1 corresponds to the first apex AX1 of the support member 10.

The first apex AX1 of the first substrate 110 and the first support substrate 210 may be the first apex AX1 disposed at a right side in FIG. 11A. For the convenience of description, the first apex AX1 disposed at the right side in FIG. 11A may be referred to as the first apex AX1 and only the first apex AX1 will be shown in the following drawings.

The knife 40 is inserted into between the first substrate 110 and the first support substrate 210 at the one end of the first substrate 110 and the first support substrate 210 to peel away a predetermined portion of the first substrate 110 from the first support substrate 210.

Figure 11B:
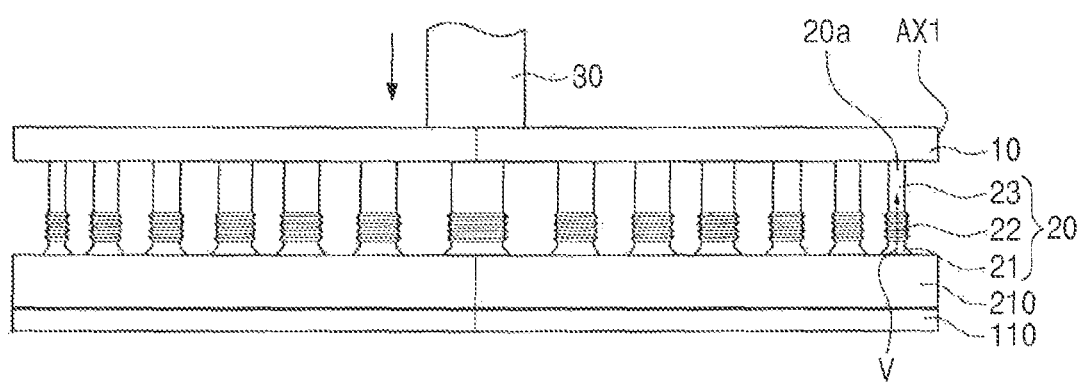
Figure 11C:
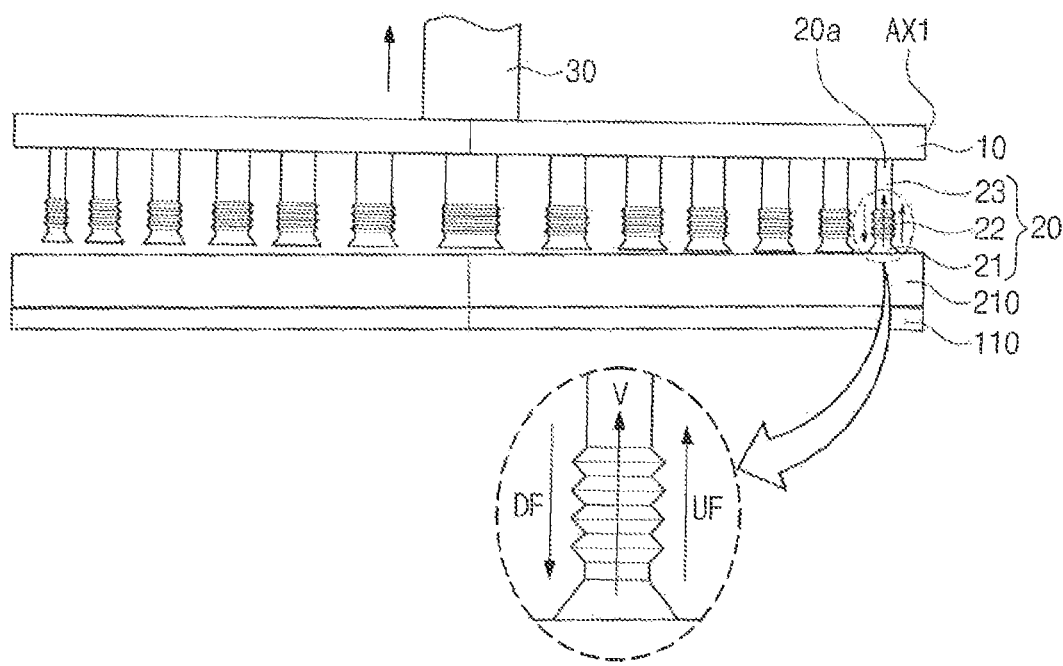

Referring to FIG. 11B, the support member 10 and the absorption pads 20 connected to the support member 10 are transferred in the down direction. The absorption pads 20 make contact with the upper surface of the first support substrate 210.

Among the absorption pads 20, the absorption pad 20a disposed on the third extension line EL3 adjacent to the first apex AX1 is driven and the other absorption pads 20 are not driven. Accordingly, the absorption pad 20a disposed on the third extension line EL3 adjacent to the first apex AX1 applies the vacuum absorption force to the first support. substrate 210, and other absorption pads do not apply the vacuum absorption force to the first support substrate 210. As a result, the first support substrate 210 is attached to the absorption pad 20a disposed on the third extension line EL3 adjacent to the first apex AX using the vacuum absorption force.

According to an exemplary embodiment, a combined structure of the first support substrate 210 and the first substrate 110 is partially separated at a corner portion of the combined structure, and then such separated corner of the combined structure is subject to a pulling-up pressure caused by the absorption pads 20 disposed on the third extension line EL3 adjacent to the first apex AX1. Referring tip FIG. 11C, the support member 10 and the absorption pads 20 connected to the support member 10 are transferred in the up direction by the driver 30.

The absorption pad 20a disposed on the third extension line EL3 adjacent to the first apex AX1 pulls up the first support substrate 210 using the vacuum absorption force. Other absorption pads 20 are pulled back from the first support substrate 210, because the other absorption pads 20 are not driven with vacuum absorption forces. Therefore, pulling-up pressure is applied to only the corner portion of the combined structure of the first support substrate 210 and the first substrate 110. The first substrate 110 start to be peeled away from the first support substrate 210 by the pulling-up force exerted by the absorption pad 20a disposed on the third extension line EL3 adjacent to the first apex AX1.

Since the other absorption pads 20 are not driven except for the absorption pad 20a disposed on the third extension line EL3 adjacent to the first apex AX1, the first support substrate 210 is pulled up only through the corner portion corresponding to the first apex AX1 of the support member 10. As a result, the first substrate 110 is peeled away from the first support substrate 210 in the area corresponding to the absorption pad 20a disposed on the third extension line EL3 adjacent to the first apex AX1.

For example, the pulling-up force is delivered to the first support substrate 210 through the buffer part 22 of the absorption pad 20a disposed on the third extension line EL3 adjacent to the first apex AX1. Due to the pulling-up force, the buffer part applies buffering forces such that the left side portion of the buffer part 22 applies a downward force DF on the first support substrate 210 by being contracted in the up and down direction, and the right side portion of the buffer part 22 applies an upward force UF on the first support substrate 210 by being expanded in the up and down direction.

When the first support substrate 210 is inclined due to the separation of the separation of the first support substrate 210 from the first substrate 110, the absorption part 21 is inclined at the same angle because the buffer part 22 is contracted and expanded.

Figure 11D:
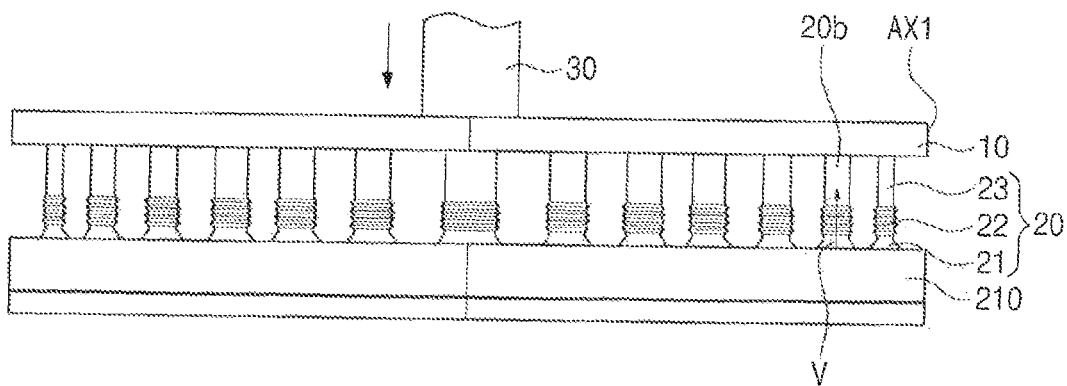

Referring to FIG. 11D, the absorption pads 20 are transferred in the down direction by the driver 30 and make contact with the upper surface of the first support substrate 210.

Among the absorption pads 20, the absorption pad 20b disposed on the third extension line EL3 which is the second absorption pad to the left of the first apex AX1 is driven with a vacuum force and the other absorption pads 20 are not driven. Therefore, the vacuum absorption force is applied to the first support substrate 210 through the absorption pad 20b only as described with reference to FIG. 11B. In FIG. 11B, the vacuum absorption force is applied to the first support substrate 210 through the absorption pad 20a only. In FIG. 11D, the vacuum absorption force is applied to the first support substrate 210 through the absorption pad 20b only.

Figure 11E:
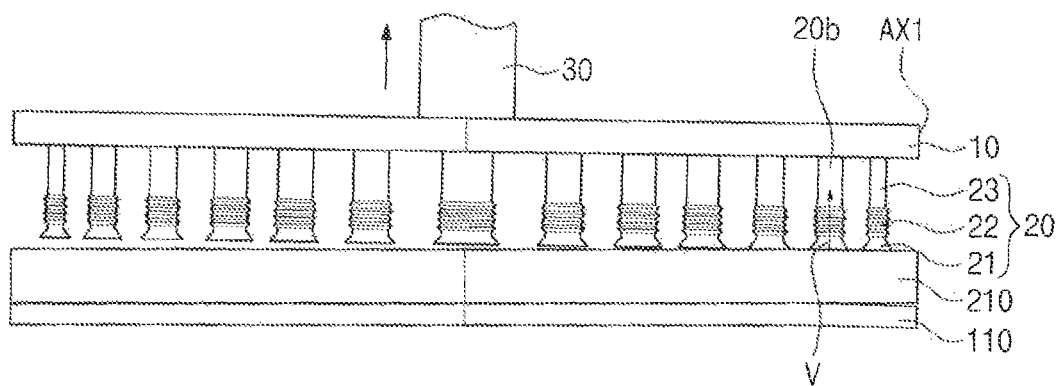

Referring to FIG. 11E, the absorption pad 20b is transferred in the up direction by the driver 30. The absorption pad 20b pulls up the first support substrate 210 using the vacuum absorption force. Therefore, the first substrate 110 is further peeled away from the first support substrate 210 by the absorption pad 20b. For the convenience of description, the absorption pad 20b is formed of one absorption pad, bus as shown in FIG. 5, the absorption pad 20b may be formed of a predetermined number of absorption pads disposed on the third extension line EL3 which is spaced apart from the first apex AX1 in the first direction D1.

Since the other absorption pads 20 are not driven except for the absorption pad 20b, the first support substrate 210 is pulled up by the absorption pad 20b only. As a result, the first substrate 110 is peeled away from the first support substrate 210 in the area corresponding to the absorption pad 20b. Referring back to FIG. 5, the absorption pad 20b is disposed on the third extension line EL3 which is the second extension line to the left of the first apex AX1.

Figure 11F:
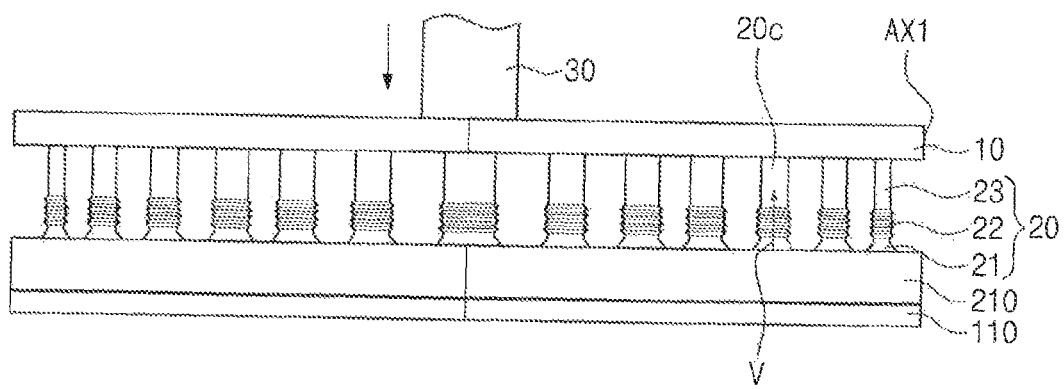
Figure 11G:
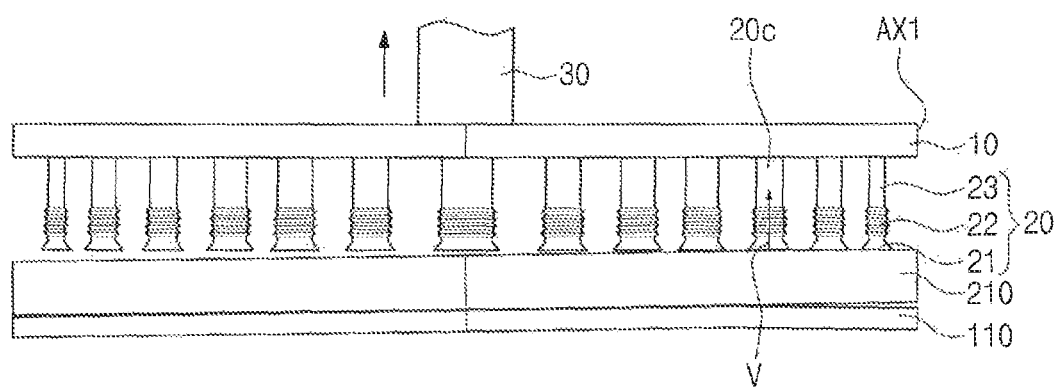

Referring to FIGS. 11F and 11G, the absorption pads 20 are transferred in the up and down direction by the driver 30 and the vacuum absorption three is applied to the first support substrate 210 using the absorption pad 20c disposed on the third extension line EL3 which is the third extension line to the left of the first apex AX1. The peeling process of the first substrate 110 from the first support substrate 210 is substantially the same as that described with reference to FIGS. 11B to 11E.

Figure 11H:
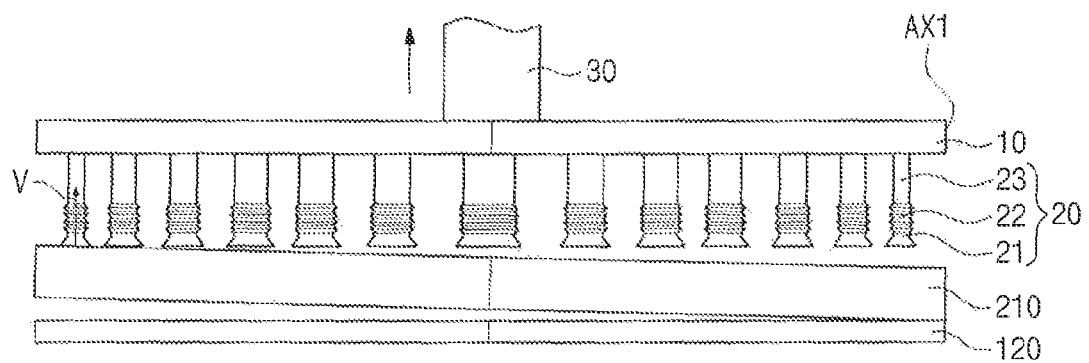

Referring to FIG. 11H, the first substrate 110 may be peeled away from the first support substrate 210 through the above-mentioned processes.

For example, the support member 10 of the substrate peeling apparatus 50 is repeatedly transferred in the up and down direction by the driver 30, and thus the absorption pads 20 make contact with the first support substrate 210. In addition, the absorption pads 20 disposed on the second extension line EL2 and the third extension lines EL3 are driven to have the vacuum absorption force from the first apex AX1 corresponding to the one end of the first substrate 110 along the first direction D1, so that the first substrate 110 is peeled away from the first support substrate 210.

According to an exemplary embodiment, the absorption pads 20, which have various sizes such that the vacuum absorption force proportional to the contact area between the first substrate 110 and the first support substrate 210 is applied, are attached to the first support substrate 210. As a result, the first substrate 110 may be precisely and efficiently peeled away from the first support substrate 210, and thus the first substrate 110 may be prevented from being damaged.

Figure 12A:
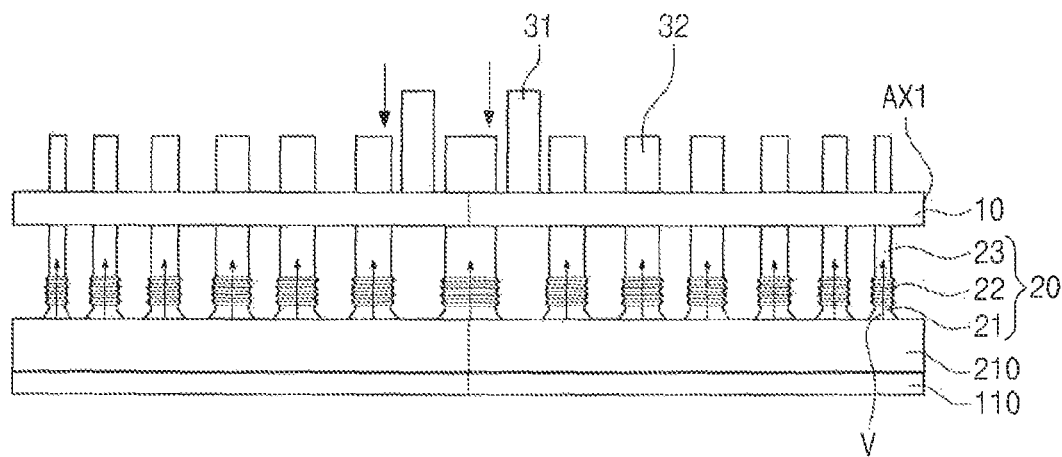
FIGS. 12A and 12B are views explaining a method of peeling a substrate using the substrate peeling apparatus of FIG. 8.
Figure 12B:
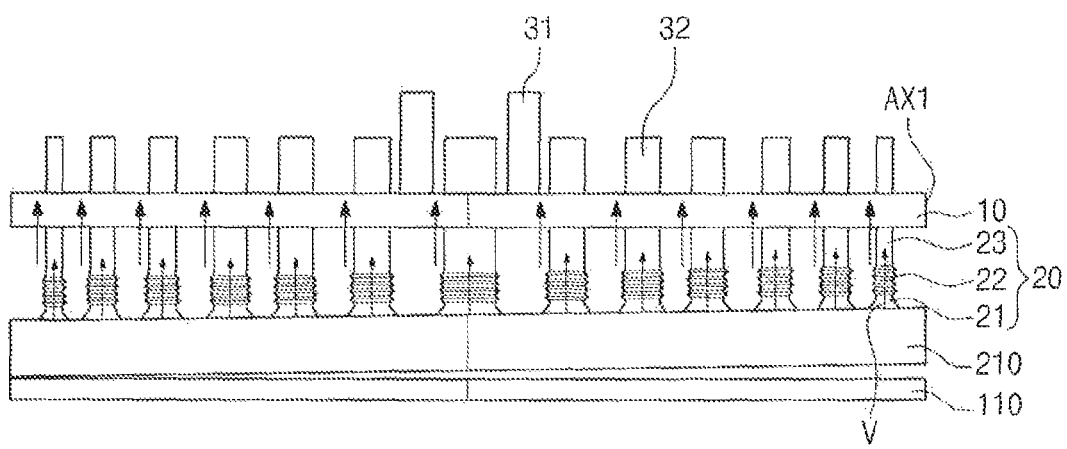

FIGS. 12A and 12B are views explaining a method of peeling a substrate using the substrate peeling apparatus according to an exemplary embodiment of the present invention.

The absorption pads 20 may be the absorption pads 20 shown in FIGS. 5 to 7. Hereinafter, the substrate peeling method of the first substrate 110 and the first support substrate 210 using the absorption pads 20 as shown in FIG. 5 will be described.

Referring to FIG. 12A, the support member 10 and the absorption pads 20 connected to the support member 10 are transferred in the down direction by the first drivers 31. The absorption pads 20 make contact with the upper surface of the first support substrate 210.

The absorption pads 20 are driven to cause the vacuum absorption force. Accordingly, the first support substrate 210 is attached to the absorption pads 20 by the vacuum absorption force.

Referring to FIG. 12B, the second drivers 32 are driven such that the absorption pads 20 corresponding thereto are transferred in the up direction.

For example, the second drivers 32 disposed on each of the third extension line EL3 are driven to allow the corresponding absorption pads 20 to be substantially simultaneously transferred in the up direction. In addition, the second drivers 32 disposed on the second extension line EL2 are driven to allow the corresponding absorption pads 20 to be substantially simultaneously transferred in the up direction.

Thus, the absorption pads 20 disposed on the same third extension line EL3 are substantially simultaneously transferred in the up direction, and the absorption pads 20 disposed on the second extension line EL2 are substantially simultaneously transferred in the up direction.

The second drivers 32 disposed on the second extension line EL2 and the third extension lines EL3 are sequentially driven from the first apex AX1 along the first direction D1. Accordingly, the absorption pads 20 are sequentially transferred in the up direction from the first apex AX1 by the second drivers 32.

In this case, the first substrate 110 is sequentially peeled away from the first apex AX1 along the first direction D1 as shown in FIG. 12B.

For example, the support member 10 is transferred in the down direction by the first drivers 31 to make contact with the absorption pads 20. Then, the absorption pads 20, which are driven to have the vacuum absorption force, are attached to the first support substrate 210 using the vacuum absorption force. After that, the absorption pads 20 disposed on the second extension line EL2 and the third extension lines EL3 are sequentially transferred in the up direction from the first apex AX1 by the second drivers 32, and thus the first substrate 110 is peeled away from the first support substrate 210.

The absorption pads 20, which have various sizes such that the absorption force applied to the first support substrate is proportional to the contact area between the first substrate 110 and the first support substrate 210, are attached to the first support substrate 210. Therefore, the first substrate 110 may be precisely and efficiently peeled away from the first support substrate 210, and thus the first substrate 110 may be prevented from being damaged.

While the present invention has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A substrate peeling method comprising:
preparing a combined structure of a substrate and a support substrate, wherein the substrate is attached to the support substrate;
partially separating the substrate from the support substrate at a predetermined area in a first corner of the combined structure;
sequentially applying a first pulling-up force to the combined structure along a first direction from the first corner of the combined structure to a center of the combined structure to separate the substrate from the support substrate, wherein the separation starts from the predetermined area of the substrate; and
sequentially applying a second pulling-up force to the combined structure along the first direction from the center of the combined structure to a second corner of the combined structure to completely separate the substrate from the support substrate,
wherein the sequentially applying of the first pulling-up force and the sequentially applying of the second pulling-up force are performed using a plurality of absorption pads having different diameters,
wherein the plurality of absorption pads includes a first absorption pad and a second absorption pad, and
wherein the sequentially applying the first pulling-up force includes:
attaching the first absorption pad having a first diameter;
pulling up the first absorption pad while the first absorption pad only is attached to the substrate support;
attaching the second absorption pad having a second diameter; and
pulling up the second absorption pad while the second absorption pad only is attached to the substrate support.

2. The substrate peeling method of claim 1,
wherein the second diameter is greater than the first diameter,
wherein the first and second absorption pads are vacuumed to be attached to the combined structure, and
wherein the first absorption pad is closer to the first corner than the second absorption pad.

3. The substrate peeling method of claim 2,
wherein the combined structure further includes third and fourth corners diagonally opposite to each other and aligned in a second direction crossing the first direction,
wherein the first absorption pad is attached on a first part of the substrate support and the first part of the substrate support is positioned on a first extension line,
wherein the second absorption pad is attached on a second part of the substrate support and the second part of the substrate support is positioned on a second extension line,
wherein the first and second extension lines are in parallel to the second direction, and
wherein the first extension line is between the second extension line and the first corner.

4. The substrate peeling method of claim 3,
wherein the first absorption pad is formed of a first number of absorption pads, and the second absorption pad is formed of a second number of absorption pads,
wherein the first number is less than the second number.

5. The substrate peeling method of claim 3,
wherein the sequentially applying an increasing pulling-up force is performed by repeatedly moving the support substrate up and down.

6. The substrate peeling method of claim 5,
wherein the repeatedly moving the support substrate up and down is performed by using by moving a support member up and down, and
wherein the plurality of absorption pads including the first and second absorption pads is disposed on the support member.

7. The substrate peeling method of claim 6,
wherein the plurality of absorption pads are vacuumed row-by-row in a diagonal direction of the support member, and
wherein the diagonal direction is parallel to the first direction.

8. The substrate peeling method of claim 1,
wherein the sequentially applying of the first pulling-up force includes an increasing the first pulling-up force from the first corner to the center,
wherein the sequentially applying of the second pulling-up force includes a decreasing the second pulling-up force from the center to the second corner, and
wherein the first pulling-up force applied to the center of the combined structure is substantially equal to the second pulling-up force applied to at the center of the combined structure.

9. The substrate peeling method of claim 1,
wherein the partially separating the substrate is performed by cutting the predetermined area using a knife, and
wherein the predetermined area includes part of the substrate in the first corner of the combined structure.

10. The substrate peeling method of claim 1,
wherein the second corner of the combined structure is diagonally opposite to the first corner, and
wherein the first and second corners and the center of the combined structure are aligned in the first direction.

* * * * *